United States Patent [19]

Sauvaget

[11] Patent Number: 4,814,080

[45] Date of Patent: Mar. 21, 1989

[54] DEVICE FOR MOUNTING PARALLEL PLANAR FILTRATION SLEEVES IN SERIES FOR WATER PURIFICATION

[76] Inventor: Jean-Claude Sauvaget, Le Joucas Chemin de Banon, Aix-en-Provence 13100, France

[21] Appl. No.: 2,624

[22] PCT Filed: Apr. 14, 1986

[86] PCT No.: PCT/FR86/00121

§ 371 Date: Dec. 10, 1986

§ 102(e) Date: Dec. 10, 1986

[87] PCT Pub. No.: WO86/06022

PCT Pub. Date: Oct. 23, 1986

[30] Foreign Application Priority Data

Apr. 17, 1985 [FR] France .............................. 85 05915

[51] Int. Cl.⁴ .............................................. B01D 25/12
[52] U.S. Cl. .................................. 210/323.2; 210/350; 210/437; 100/295; 100/296
[58] Field of Search .................... 210/323.2, 349, 350, 210/351, 437, 453, 321.8; 100/295, 296

[56] References Cited

U.S. PATENT DOCUMENTS

| | | |
|---|---|---|
| 3,098,429 | 12/1960 | Hagglund . |
| 3,348,578 | 10/1967 | Mercier . |
| 4,260,492 | 4/1981 | Ito et al. .............................. 210/386 |
| 4,397,746 | 8/1983 | Kratochvil .......................... 210/350 |

FOREIGN PATENT DOCUMENTS

| | | |
|---|---|---|
| 0884951 | 12/1980 | Belgium . |
| 3240326 | 5/1984 | Fed. Rep. of Germany . |
| 2532556 | 3/1984 | France . |
| 2086751 | 5/1982 | United Kingdom . |

Primary Examiner—Richard V. Fisher
Assistant Examiner—Coreen Y. Lee
Attorney, Agent, or Firm—Sandler & Greenblum

[57] ABSTRACT

A filtration device provided with two rigid surfaces and two or more pneumatic supports disposed therebetween; one pneumatic support is mounted on each of the rigid surfaces. Two or more flexible tubular filtration elements are disposed in one or more rows between the pneumatic supports; in each row, the flexible tubular filtration elements are in parallel alignment.

7 Claims, 1 Drawing Sheet

DEVICE FOR MOUNTING PARALLEL PLANAR FILTRATION SLEEVES IN SERIES FOR WATER PURIFICATION

BACKGROUND OF THE INVENTION

1. Field of the Invention

The invention relates to a device allowing for mounting parallel planar filtration sleeves in series for water purification. The device of the invention provides for continuous filtration and separation of fluid and solid products, and has particular utility in the food, industrial, and agricultural industries, as well as in other fields.

2. Description of Background and Relevant Materials

Experience has shown that, for continuous filtration and separtion of fluid and solid products, systems employing filtration sleeves with pressure cuffs on their periphery do not permit consistent pressure to be obtained. Accordingly, filtration is adversely affected. Additionally, not only do such devices require a significant amount of space, but, further, the supply and discharge of the sleeves requires complex and expensive installations.

The device according to the invention does away with these inconveniences, providing for the installation of filtration sleeves in series and in parallel planes; thereby, the functioning of a given quantity of sleeves in a reduced space, at a uniform pressure, and at constant rates, is assured.

SUMMARY OF THE INVENTION

The invention comprises a series of tubes disposed in planar layers between two or more inflatable pressing mattresses, or pneumatic supports, kept in place by a rigid frame.

BRIEF DESCRIPTION OF THE DRAWINGS

The invention will now be described with reference to the following drawings, which are provided by way of example, not limitation.

DESCRIPTION OF PREFERRED EMBODIMENTS

The filtration sleeves 1, 2 and 3 are disposed between two inflatable pressing mattresses 4 and 5.

These mattresses are inflated by two-way valves 6 and 7, which may be rapid two-way valves, and are connected to a pressurized air tank (not shown). The mattresses are placed between two rigid frames, or flat plates, 8 and 9.

Figure 1:
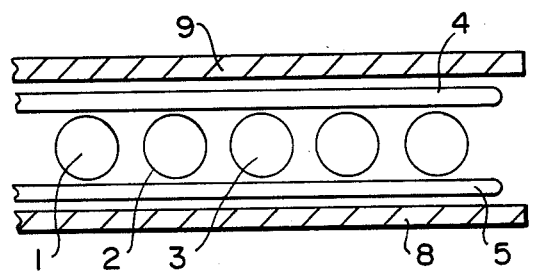
FIGS. 1 and 2 show the operation of the elements comprising the device of the invention.
Figure 2:
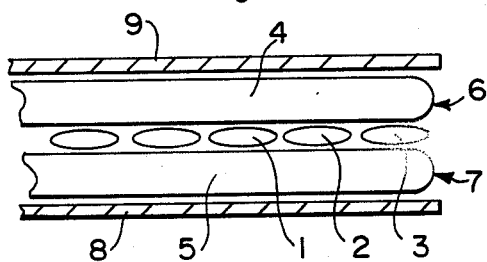

These mattresses change volume under pressure; as shown in FIG. 2, these mattresses, from a minimum thickness 10 and 11, can attain a maximum thickness 12 and 13, at which point they completely compress the filtration sleeves.

Accordingly, the output of the system is improved considerably, and the purification and concentration of the muds is facilitated.

The alternation of compression and decompression of the filters promotes cleaning of the filtration tissue, thereby eliminating the necessity for a cleaning step. Further, the compressions and decompressions facilitate the opening and closing of the admission valve of the filtration sleeves.

The pneumatic valves for pressurizing the mattresses, combined with the relays of admission to the filters, allows for the cycles to be modulated in accordance with the nature of the mud.

Figure 3:
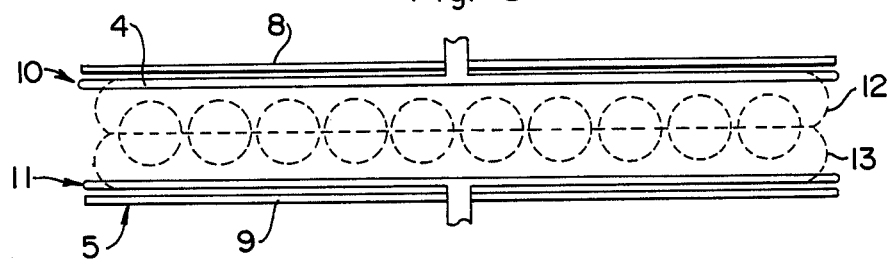
FIG. 3 shows one embodiment of the device.

Accordingly, as shown in FIG. 3, varying numbers of banks of filtration sleeves, without limitation, can be provided in reduced spaces. The operation is simplified because one single admission and evacuation are used for the compression elements.

Adjustments are similarly simplified. Rate of operation can be adjusted by control of the rates of capture, and of the pressures.

Figure 4:
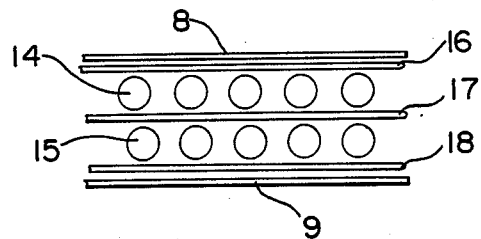
FIG. 4 shows a second embodiment of the device.

As shown in FIG. 4, it is possible to alternate the layers of filtration tubes 14 and 15 with mattresses 16, 17, and 18 between rigid walls 8 and 9; in this way, several layers functioning in parallel can be provided.

The invention is not limited to the particular shapes, dimensions, and placement of the different elements, or to the particular materials used in their construction. The invention extends to equivalents thereof, without departing from the general concept of the invention as described.

I claim:

1. A filtration device comprising:
   (a) two flat plates;
   (b) a plurality of pneumatic supports disposed in parallel alignment with one another between said flat plates; each flat plate having one pneumatic support mounted thereon; and
   (c) a plurality of flexible tubular filtration elements disposed in at least one essentially straight row between said pneumatic supports such that each essentially straight row of flexible tubular filtration elements is compressed between two pneumatic supports by inflation of said pneumatic supports, said flexible tubular filtration elements disposed in said at least one essentially straight row being disposed in parallel alignment.

2. The filtration device as defined by claim 1 wherein each of said plurality of pneumatic supports is provided with a valve for inflation and deflation.

3. The filtration device as defined by claim 1 wherein said plurality of pneumatic supports comprises two pneumatic supports, and said plurality of flexible filtration elements comprises a single essentially straight row of flexible filtration elements.

4. The filtration device as defined by claim 1 wherein said at least one essentially straight row of flexible filtration elements comprises a plurality of rows of said flexible filtration elements, said plurality of rows of said flexible filtration elements and said plurality of pneumatic supports being arranged to provide alternating layers of said rows and said pneumatic supports without flat plates intervening between said alternating layers.

5. The filtration device as defined by claim 4 wherein each of said plurality of pneumatic supports is provided with a valve for inflation and deflation.

6. The filtration device as defined by claim 4; wherein said plurality of pneumatic supports are in parallel alignment.

7. The filtration device as defined by claim 4 wherein said at least one essentially straight row of flexible filtration elements comprises two essentially straight rows of flexible filtration elements, and said plurality of pneumatic supports comprises three pneumatic supports.

* * * * *